United States Patent
Lin et al.

(10) Patent No.: US 9,016,891 B2
(45) Date of Patent: Apr. 28, 2015

(54) ILLUMINATION APPARATUS

(71) Applicants: Dongguan Masstop Liquid Crystal Display Co., Ltd., Dongguan, Guangdong Province (CN); Wintek Corporation, Taichung (TW)

(72) Inventors: Ming-Chuan Lin, Taichung (TW); Chin-Liang Chen, Taichung (TW); Zhi-Ting Ye, Miaoli County (TW); Tang-Hao Weng, Taichung (TW)

(73) Assignees: Dongguan Masstop Liquid Crystal Display Co., Ltd., Dongcheng District, Dongguan, Guangdong Province (CN); Wintek Corporation, Tanzi District, Taichung (TW)

( * ) Notice: Subject to any disclaimer, the term of this patent is extended or adjusted under 35 U.S.C. 154(b) by 314 days.

(21) Appl. No.: 13/742,326

(22) Filed: Jan. 15, 2013

(65) Prior Publication Data

US 2013/0208460 A1    Aug. 15, 2013

(30) Foreign Application Priority Data

Feb. 10, 2012 (TW) .............................. 101202453 U

(51) Int. Cl.
| | |
|---|---|
| F21V 21/00 | (2006.01) |
| F21V 29/00 | (2006.01) |
| F21V 17/00 | (2006.01) |
| F21V 19/00 | (2006.01) |
| F21K 99/00 | (2010.01) |
| F21V 15/01 | (2006.01) |
| F21V 17/12 | (2006.01) |
| F21Y 101/02 | (2006.01) |
| F21Y 103/00 | (2006.01) |
| F21V 8/00 | (2006.01) |

(52) U.S. Cl.
CPC ............... *F21V 21/00* (2013.01); *F21V 29/004* (2013.01); *F21V 29/20* (2013.01); *F21V 29/246* (2013.01); *F21K 9/30* (2013.01); *F21K 9/52* (2013.01); *F21V 15/011* (2013.01); *F21V 17/005* (2013.01); *F21V 17/12* (2013.01); *F21V 19/008* (2013.01); *F21Y 2101/02* (2013.01); *F21Y 2103/00* (2013.01); *G02B 6/0078* (2013.01)

(58) Field of Classification Search
CPC ..... F21V 17/005; F21V 17/12; F21V 19/008; F21V 21/00; F21V 29/004; F21V 29/20
See application file for complete search history.

(56) References Cited

U.S. PATENT DOCUMENTS

| | | | |
|---|---|---|---|
| 8,348,489 B2 * | 1/2013 | Holman et al. ................ | 362/600 |
| 2004/0160766 A1 * | 8/2004 | Schultz .......................... | 362/217 |
| 2008/0232116 A1 * | 9/2008 | Kim .............................. | 362/365 |

* cited by examiner

*Primary Examiner* — Stephen F Husar
(74) *Attorney, Agent, or Firm* — Winston Hsu; Scott Margo

(57) ABSTRACT

An illumination apparatus includes a light emitting module and a containing base. The light emitting module includes a light guide bar and a light emitting device disposed on an end of the light guide bar. The light emitting device includes a heat dissipating sheet and a light emitting element. The heat dissipating sheet has a first positioning component. The light emitting element is disposed on the heat dissipating sheet for emitting light to the light guide bar. The containing base is used for containing the light emitting module. A second positioning component is formed on a side of the containing base corresponding to the first positioning component. The second positioning component is used for engaging with the first positioning component when the light emitting module is disposed on the containing base, so as to fix a position of the light emitting module relative to the containing base.

18 Claims, 6 Drawing Sheets

ILLUMINATION APPARATUS

BACKGROUND OF THE INVENTION

1. Field of the Invention

The present invention relates to an illumination apparatus, and more specifically, to an illumination apparatus utilizing engagement of a first positioning component of a heat dissipating sheet and a second positioning component of a containing base to position a light emitting module in the containing base.

2. Description of the Prior Art

In general, a conventional illumination apparatus usually utilizes a fluorescent lamp as a light source. In recent years, for achieving the environmental protection and energy saving purposes, the fluorescent lamp has gradually been replaced by a light emitting module composed of an LED (Light Emitting Diode) and a light guide bar. However, since a common fixing design of the aforesaid light emitting module involves utilizing human eyes to align the light emitting module with a containing base of the illumination apparatus and then utilizing twin adhesive tapes to stick two ends of the light emitting module to the containing base, the said fixing design may cause a misalignment problem and a time-consuming and strenuous assembly process. Furthermore, the said fixing design may also cause a complicated replacement process and make repetitive assembly of the light emitting module difficult due to the adhesive property of the twin adhesive tapes.

SUMMARY OF THE INVENTION

The present invention provides an illumination apparatus including at least one light emitting module and a containing base. The light emitting module includes a light guide bar and at least one light emitting device. The light emitting device is disposed on at least one end of the light guide bar. The light emitting device includes a heat dissipating sheet, and a light emitting element. The heat dissipating sheet has at least one first positioning component. The light emitting element is disposed on the heat dissipating sheet for emitting light to the light guide bar. The containing base is for containing the light emitting module. A second positioning component is formed on a side of the containing base corresponding to the first positioning component. The second positioning component is used for engaging with the first positioning component when the light emitting module is disposed on the containing base, so as to fix a position of the light emitting module relative to the containing base.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
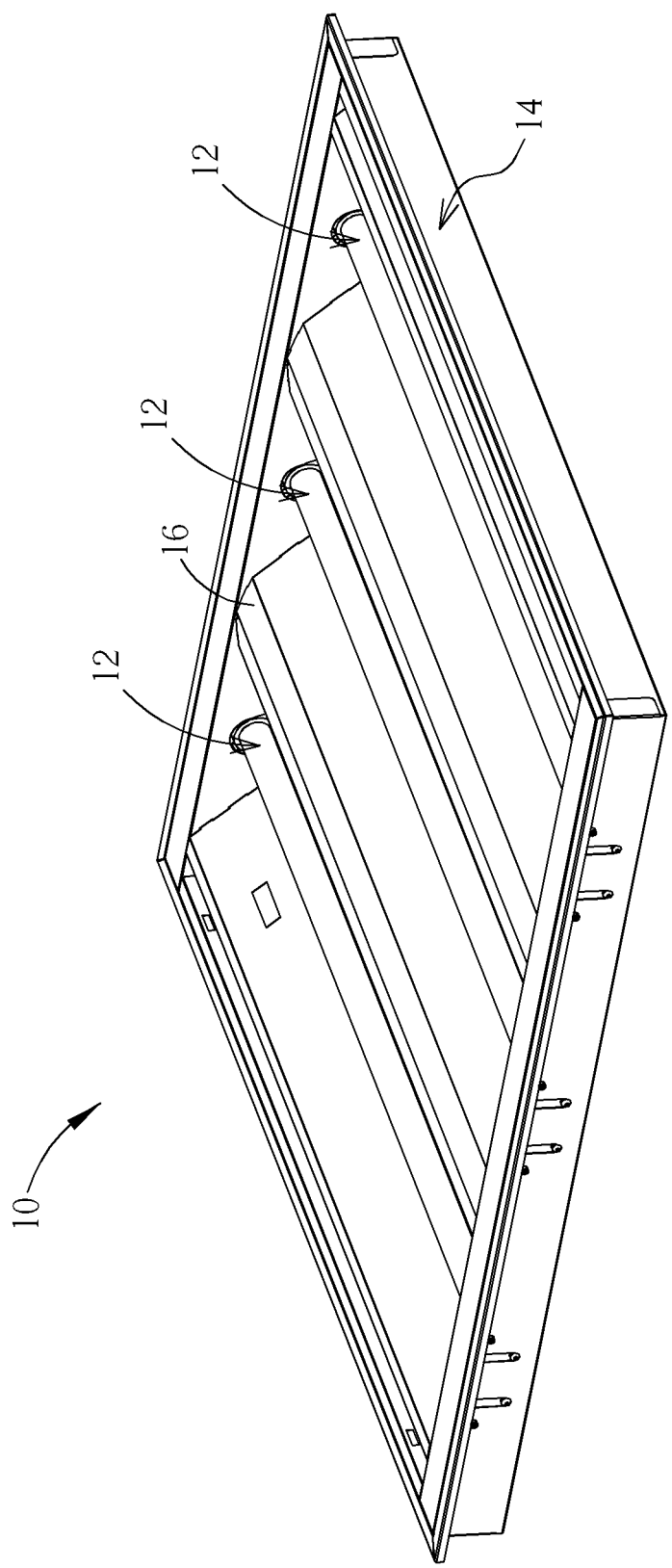
FIG. 1 is an assembly diagram of an illumination apparatus according to an embodiment of the present invention.
Figure 2:
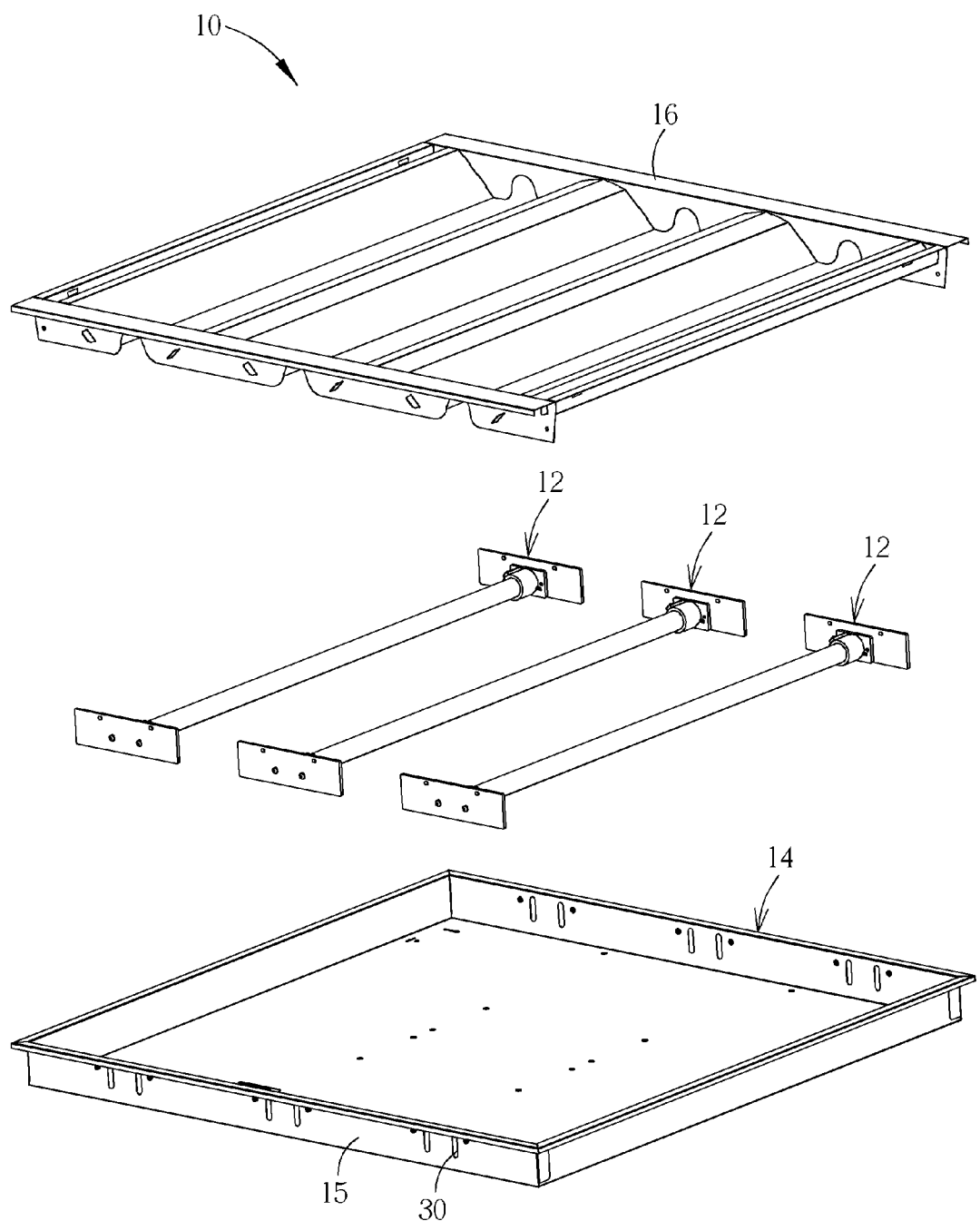
FIG. 2 is a partial exploded diagram of the illumination apparatus in FIG. 1.

Please refer to FIG. 1 and FIG. 2. FIG. 1 is an assembly diagram of an illumination apparatus 10 according to an embodiment of the present invention. FIG. 2 is a partial exploded diagram of the illumination apparatus 10 in FIG. 1. As shown in FIG. 1 and FIG. 2, the illumination apparatus 10 includes at least one light emitting module 12 (three shown in FIG. 1 and FIG. 2 respectively) and a containing base 14. The containing base 14 is used for containing the light emitting module 12. The containing base 14 is preferably a lightweight steel casing commonly applied to a conventional illumination apparatus. To be noted, the illumination apparatus 10 can further include a protection cover 16. The protection cover 16 is used for covering the light emitting module 12 for preferable aesthetic appearance and protection of related driving circuit components (e.g. cables and a driving board) of the light emitting module 12. As for the structural design of the protection cover 16, its related description is commonly seen in the prior art and therefore omitted herein.

Figure 3:
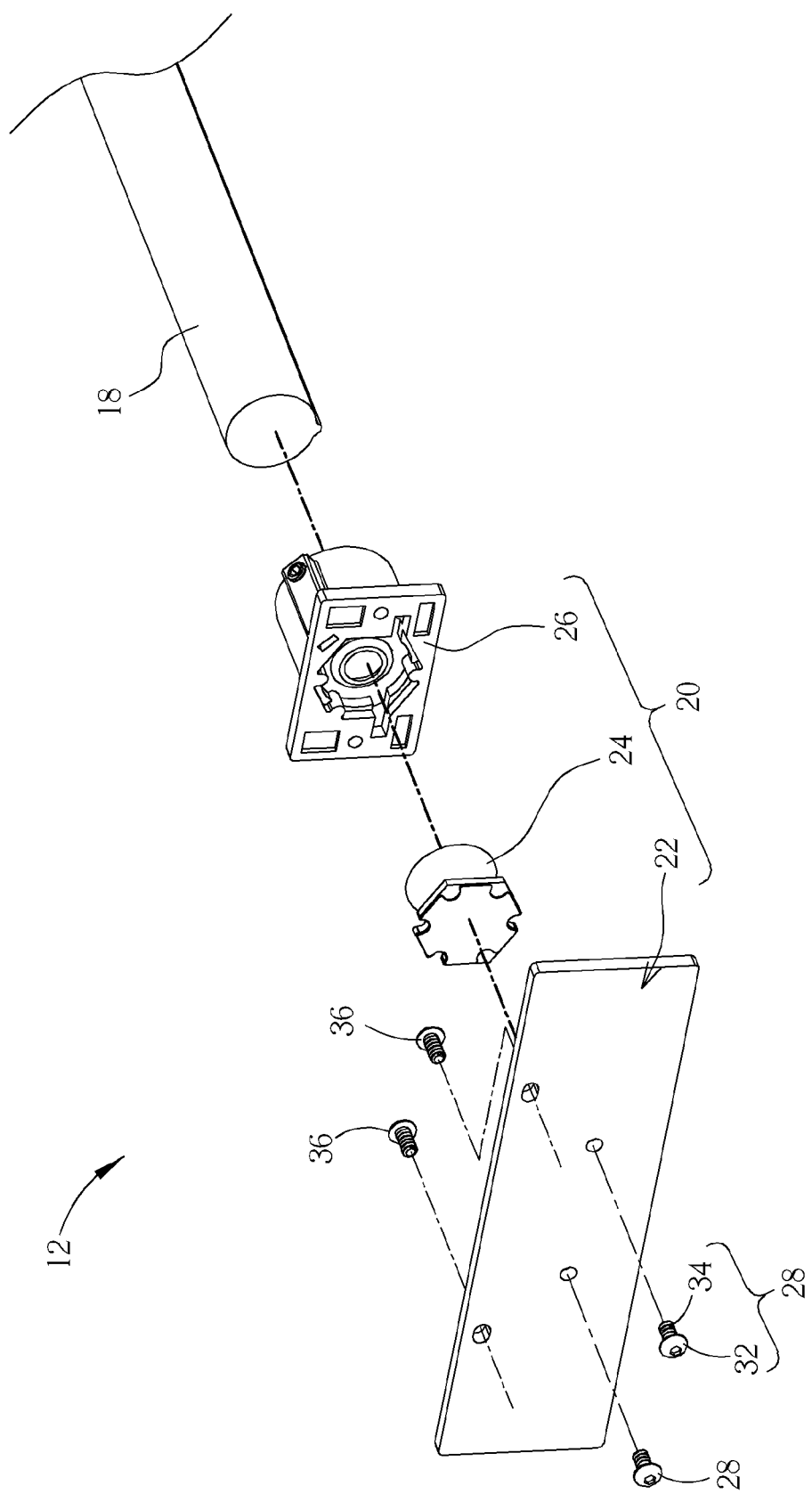
FIG. 3 is a partial exploded diagram of the light emitting module in FIG. 2.

More detailed description for the component disposition of one of the light emitting modules 12 in FIG. 2 and the design of positioning the light emitting module 12 in the containing base 14 is provided as follows. As for related description for other light emitting modules 12, it can be reasoned by analogy and therefore omitted herein. Please refer to FIG. 2 and FIG. 3. FIG. 3 is a partial exploded diagram of the light emitting module 12 in FIG. 2. As shown in FIG. 2 and FIG. 3, the light emitting module 12 includes a light guide bar 18 and at least one light emitting device 20. The light emitting device 20 is disposed on at least one end of the light guide bar 18. Accordingly, the light emitting module 12 can utilize the design in which light generated by the light emitting device 20 is emitted out of the light guide bar 18, to provide illumination with sufficient brightness and uniform distribution. In this embodiment, the light emitting device 20 is disposed on two ends of the light guide bar 18 respectively, but is not limited thereto. That is, in another embodiment, the light emitting device 20 can be only disposed on one end of the light guide bar 18.

The light emitting device 20 includes a heat dissipating sheet 22, a light emitting element 24, and a sleeve 26. The light emitting element 24 could be a light emitting diode, but not limited thereto, meaning that the light emitting element 24 could also be other common light emitting device. The light emitting element 24 is disposed on the heat dissipating sheet 22 for emitting light into the light guide bar 18. The heat dissipating sheet 22 is preferably made of heat conductive material (e.g. metal) for quickly transmitting thermal energy of the light emitting element 24 to the outer environment via the containing base 14. As for the circuit and cable designs of the light emitting element 24 and the heat dissipating design of the heat dissipating sheet 22, they are commonly seen in the prior art and the related description is therefore omitted herein.

The sleeve 26 is disposed between the light guide bar 18 and the heat dissipating sheet 22 and sleeved on the light emitting element 24, for connecting the light emitting element 24 and the heat dissipating sheet 22 to the light guide bar 18. Furthermore, as shown in FIG. 2 and FIG. 3, the heat dissipating sheet 22 has at least one first positioning component 28 (two shown in FIG. 3). A second positioning component 30 is formed on a side 15 of the containing base 14 corresponding to the first positioning component 28. In this embodiment, the first positioning component 28 is preferably a fixing screw and includes a head portion 32 and a thread portion 34, and the second positioning component 30 is preferably a guiding slot. The thread portion 34 is used for screwing the heat dissipating sheet 22 onto the sleeve 26. The head portion 32 is used for engaging with the second positioning component 30.

Besides, as shown in FIG. 3, the heat dissipating sheet 22 can further have at least one fixing screw 36 (two shown in FIG. 3). Accordingly, the fixing screw 36 can be utilized to screw the heat dissipating sheet 22 onto the side 15 of the containing base 14 tightly when the head portion 32 is engaged with the second positioning component 30, so as to improve the connection strength and the heat transmitting efficiency of the light emitting module 12 and the containing base 14.

Figure 4:
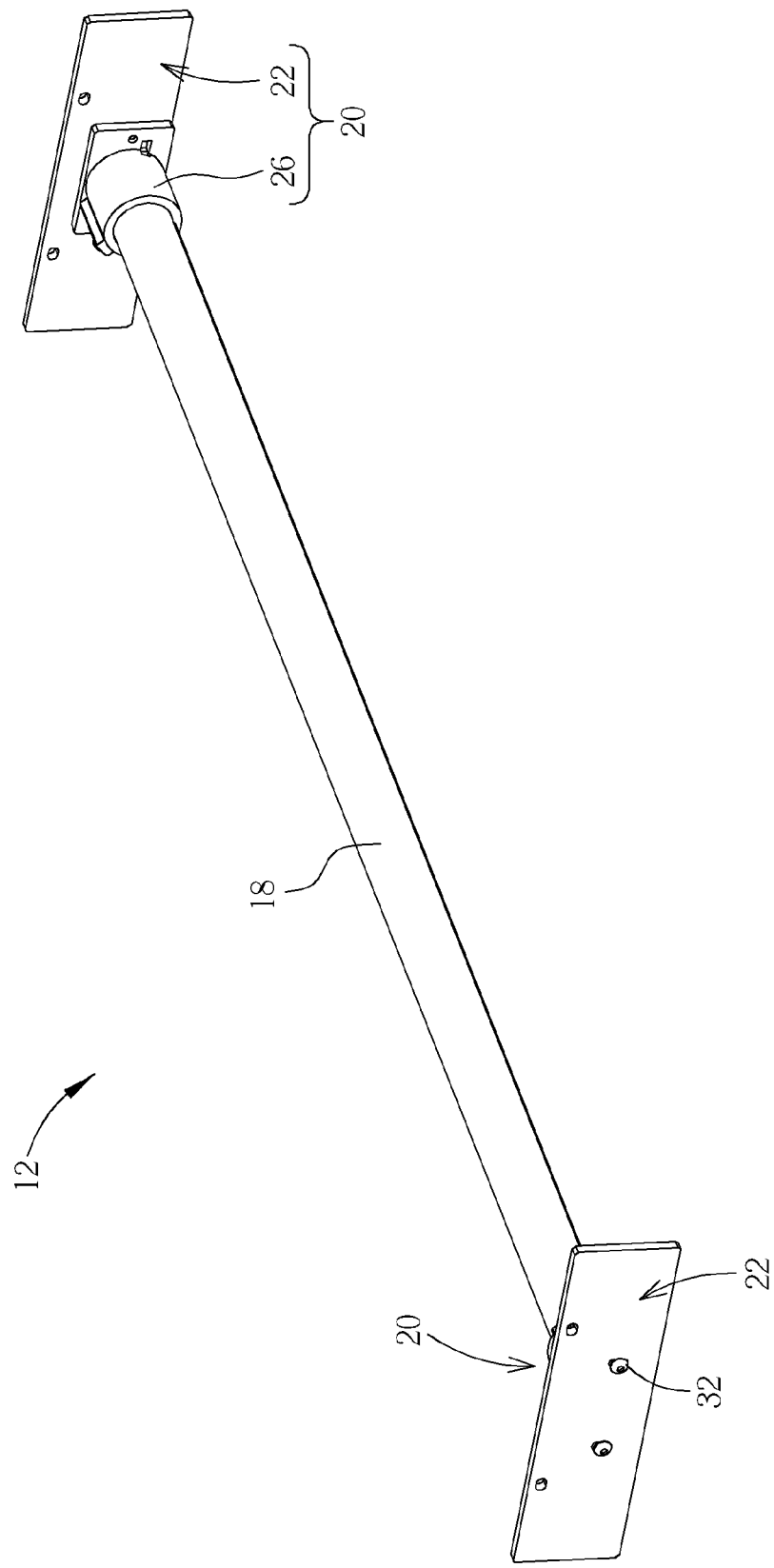
FIG. 4 is an assembly diagram of the light emitting module in FIG. 3.
Figure 5:
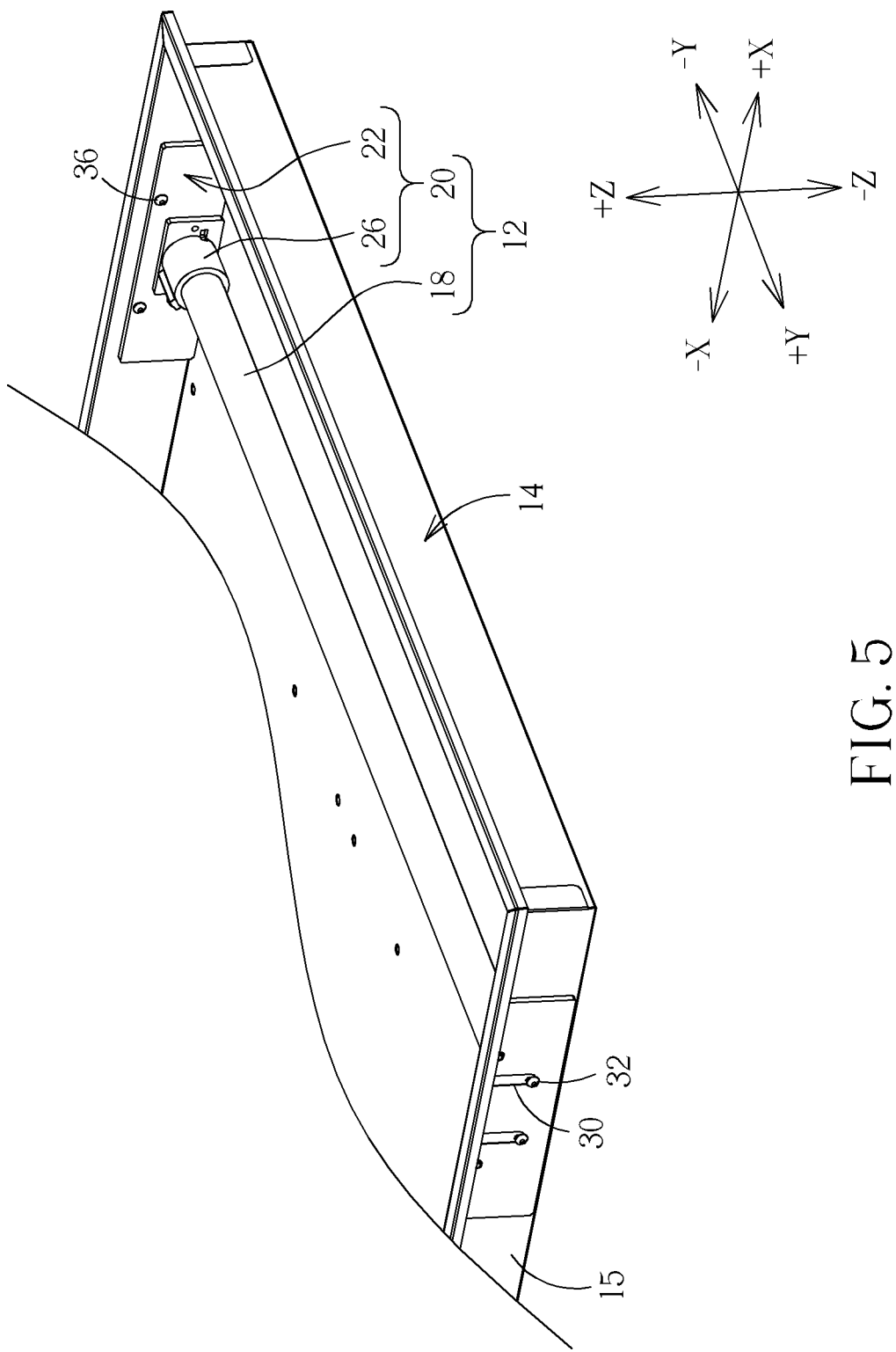
FIG. 5 is an assembly diagram of the light emitting module being disposed on a containing base.

More detailed description for assembly of the illumination apparatus 10 is provided as follows. Please refer to FIG. 1, FIG. 3, FIG. 4, and FIG. 5. FIG. 4 is an assembly diagram of the light emitting module 12 in FIG. 3. FIG. 5 is an assembly diagram of the light emitting module 12 in FIG. 4 being disposed on the containing base 14. At first, the sleeve 26 in FIG. 3 is sleeved on the light guide bar 18 and the light emitting elements 24 disposed on the heat dissipating sheet 22, and the thread portion 34 of the first positioning component 28 is then utilized to screw the heat dissipating sheet 22 onto the sleeve 26. In such a manner, the heat dissipating sheet 22 and the light emitting element 24 can be connected to the light guide bar 18, so as to complete assembly of the light emitting module 12. At this time, as shown in FIG. 4, the head portion 32 of the first positioning component 28 protrudes from the heat dissipating sheet 22.

Subsequently, the head portion 32 protruding from the heat dissipating sheet 22 can be aligned with the second positioning component 30 located at the side 15 of the containing base 14, and the light emitting module 12 can be then pressed downward into the containing base 14. During this process, the head portion 32 of the first positioning component 28 can be engaged with the second positioning component 30 and then move downward to a position as shown in FIG. 5 via guidance of the second positioning component 30, so as to position the light emitting module 12 in the containing base 14. In such a manner, the illumination apparatus 10 can utilize engagement of the head portion 32 of the first positioning component 28 and the second positioning component 30 to constrain movement of the light emitting module 12 toward ±X-axis direction, ±Y-axis direction, and −Z-axis direction. To be noted, in this embodiment, since the containing base 14 is a lightweight steel casing as mentioned above, the light emitting module 12 may cause the containing base 14 to deform outward when the light emitting module 12 is pressed downward into the containing base 14, so that the first positioning component 28 can be engaged with the second positioning component 30 more easily and smoothly.

Finally, after the heat dissipating sheet 22 is screwed onto the side 15 of the containing base 14 by the fixing screws 36 (as shown in FIG. 5) to constrain movement of the light emitting module 12 toward +Z-axis direction and the protection cover 16 is then utilized to cover the light emitting module 12, assembly of the illumination apparatus 10 can be completed accordingly (as shown in FIG. 1).

Figure 6:
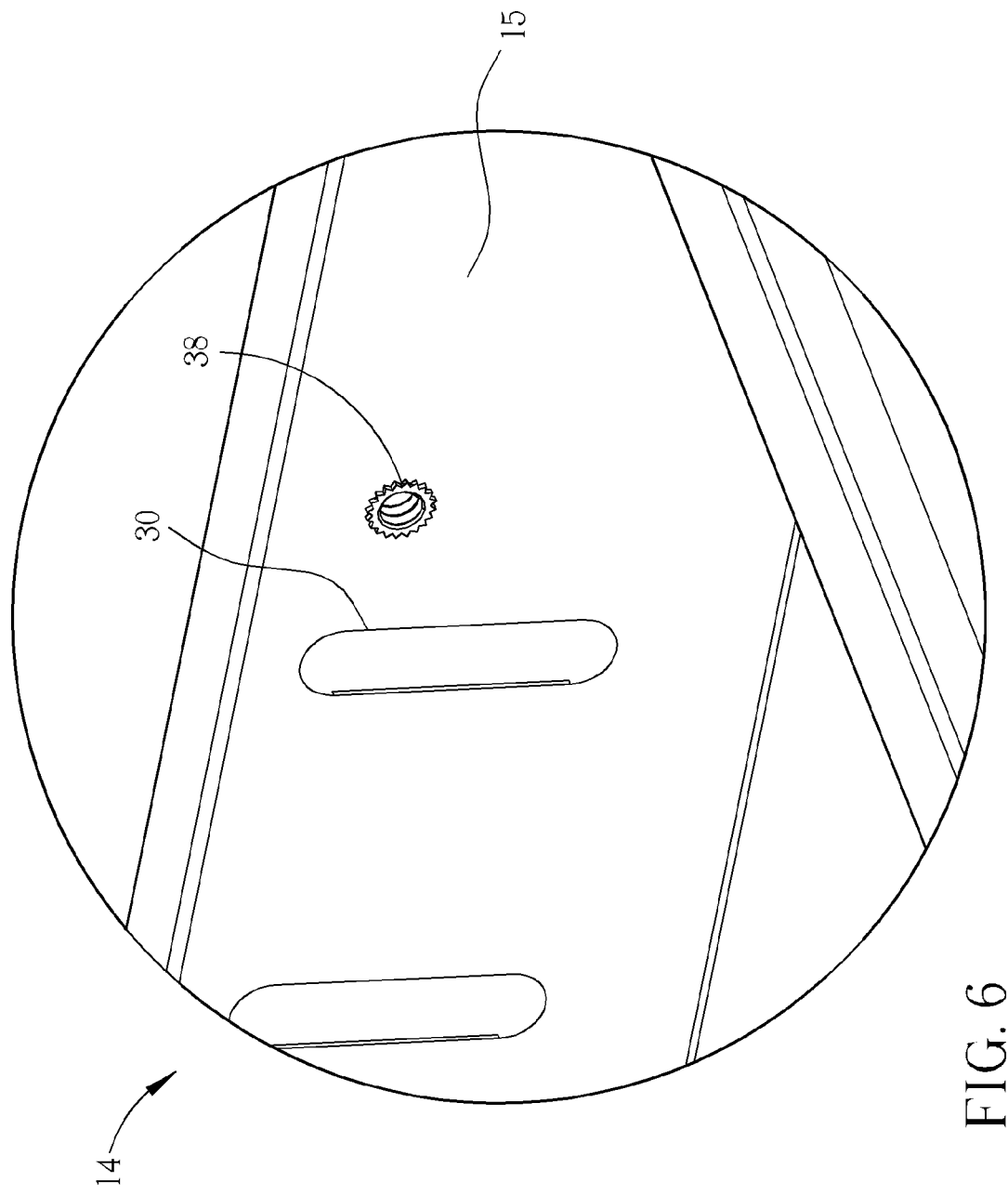
FIG. 6 is a partial enlarged diagram of the containing base in FIG. 5.

Furthermore, in this embodiment, for achieving the purpose that the heat dissipating sheet 22 can be screwed onto the side 15 of the containing base 14 by the fixing screws 36 more easily and smoothly and the purpose that the connection strength and the contact area of the heat dissipating sheet 22 and the containing base 14 can be further increased, corresponding rivets 38 can be further disposed on the side 15 of the containing base 14 for cooperating with the fixing screws 36. The related disposition can be as shown in FIG. 6, which is a partial enlarged diagram of the containing base 14 in FIG. 5.

In summary, via engagement of the first positioning component 28 of the heat dissipating sheet 22 and the second positioning component 30 of the containing base 14, the light emitting module 12 can be positioned in the containing base 14 precisely and quickly. In such a manner, since the present invention only utilizes a simple engagement design to complete positioning of the light emitting module in the containing base without performing the aforesaid manual sticking method with human eyes, the present invention can efficiently prevent the light emitting module from being misaligned with the containing base. Furthermore, via the aforesaid simple engagement design, the present invention can further simplify the assembly process of the illumination apparatus so as to solve the problem that the replacement process of the light emitting module is complicated and repetitive assembly of the light emitting module is difficult above-mentioned in the prior art.

It should be mentioned that the structural designs of the first positioning component 28 and the second positioning component 30 are not limited to the aforesaid embodiment. In other words, all designs of utilizing engagement of the heat dissipating sheet and the containing base to position the light emitting module in the containing base may fall within the scope of the present invention. For example, the first positioning component 28 can be one of a guiding slot and a protruding bump structure directly formed on the heat dissipating sheet 22, and the second positioning component 30 can be correspondingly the other one of the guiding slot and the protruding bump structure.

In another embodiment, the first positioning component 28 can be one of a concave hole structure (e.g. a through hole or a blind hole) and a protruding bump structure directly formed on the heat dissipating sheet 22, and the second positioning component 30 can be correspondingly the other one of the concave hole structure and the protruding bump structure. To be noted, in this embodiment, since there is no need to utilize the fixing screw 36 to constrain movement of the light emitting module 12 toward +Z-axis direction, the fixing screw 36 can be an omissible component for simplifying the structural design of the illumination apparatus 10.

Furthermore, the sleeve 26 can also be an omissible component, meaning that the illumination apparatus 10 can also utilize the design in which the heat dissipating sheet 22 with the light emitting element 24 installed thereon is directly connected to an end of the light guide bar 18 (e.g. embedding the light emitting element 24 into the heat dissipating sheet 22 and then connecting the light guide bar 18 to the heat dissipating sheet 22 corresponding to the light emitting element 24).

Compared with the prior art utilizing the manual sticking method with human eyes, the present invention utilizes the design in which the first positioning component of the heat dissipating sheet is engaged with the second positioning component of the containing base, to position the light emitting module in the containing base precisely and quickly. In such a manner, since the present invention only utilizes the aforesaid simple engagement design to complete positioning of the light emitting module in the containing base without performing the aforesaid manual sticking method, the present invention can efficiently prevent the light emitting module from being misaligned with the containing base. Furthermore, via the aforesaid simple engagement design, the present invention can further simplify the assembly process of the illumination apparatus so as to solve the problem that the replacement process of the light emitting module is complicated and repetitive assembly of the light emitting module is difficult above-mentioned in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An illumination apparatus comprising:
    at least one light emitting module comprising:
        a light guide bar; and
        at least one light emitting device disposed on at least one end of the light guide bar, the light emitting device comprising:
            a heat dissipating sheet having at least one first positioning component; and
            a light emitting element disposed on the heat dissipating sheet for emitting light to the light guide bar; and
        a containing base for containing the light emitting module, a second positioning component being formed on a side of the containing base corresponding to the first positioning component, and the second positioning component being used for engaging with the first positioning component when the light emitting module is disposed on the containing base, so as to fix a position of the light emitting module relative to the containing base.

2. The illumination apparatus of claim 1, wherein the light emitting device further comprises:
    a sleeve disposed on the light guide bar and the heat dissipating sheet and sleeved on the light emitting element.

3. The illumination apparatus of claim 2, wherein the second positioning component is a guiding slot, the first positioning component is a fixing screw and comprises a head portion and a thread portion, the thread portion is used for screwing the heat dissipating sheet onto the sleeve, and the head portion is used for engaging with the second positioning component.

4. The illumination apparatus of claim 3, wherein the heat dissipating sheet is fixed onto the side of the containing base in a screw locking manner when the head portion is engaged with the second positioning component.

5. The illumination apparatus of claim 1, wherein the first positioning component is one of a protruding bump structure and a concave hole structure, and the second positioning component is the other one of the protruding bump structure and the concave hole structure.

6. The illumination apparatus of claim 2, wherein the first positioning component is one of a protruding bump structure and a concave hole structure, and the second positioning component is the other one of the protruding bump structure and the concave hole structure.

7. The illumination apparatus of claim 5, wherein the concave hole structure is a through hole or a blind hole.

8. The illumination apparatus of claim 6, wherein the concave hole structure is a through hole or a blind hole.

9. The illumination apparatus of claim 5, wherein the heat dissipating sheet is fixed onto the side of the containing base in a screw locking manner when the first positioning component is engaged with the second positioning component.

10. The illumination apparatus of claim 6, wherein the heat dissipating sheet is fixed onto the side of the containing base in a screw locking manner when the first positioning component is engaged with the second positioning component.

11. The illumination apparatus of claim 1, wherein the first positioning component is one of a protruding bump structure and a guiding slot, and the second positioning component is the other one of the protruding bump structure and the guiding slot.

12. The illumination apparatus of claim 2, wherein the first positioning component is one of a protruding bump structure and a guiding slot, and the second positioning component is the other one of the protruding bump structure and the guiding slot.

13. The illumination apparatus of claim 11, wherein the heat dissipating sheet is fixed onto the side of the containing base in a screw locking manner when the first positioning component is engaged with the second positioning component.

14. The illumination apparatus of claim 12, wherein the heat dissipating sheet is fixed onto the side of the containing base in a screw locking manner when the first positioning component is engaged with the second positioning component.

15. The illumination apparatus of claim 1 further comprising:
    a protection cover covering the light emitting module.

16. The illumination apparatus of claim 2 further comprising:
    a protection cover covering the light emitting module.

17. The illumination apparatus of claim 1, wherein the containing base is a lightweight steel casing.

18. The illumination apparatus of claim 1, wherein the light emitting element is a light emitting diode.

* * * * *